No. 749,551. PATENTED JAN. 12, 1904.
C. L. GOEHRING & W. TROCHE.
ART OF BEVELING GLASS OR LIKE SUBSTANCES.
APPLICATION FILED SEPT. 9, 1901.
NO MODEL.
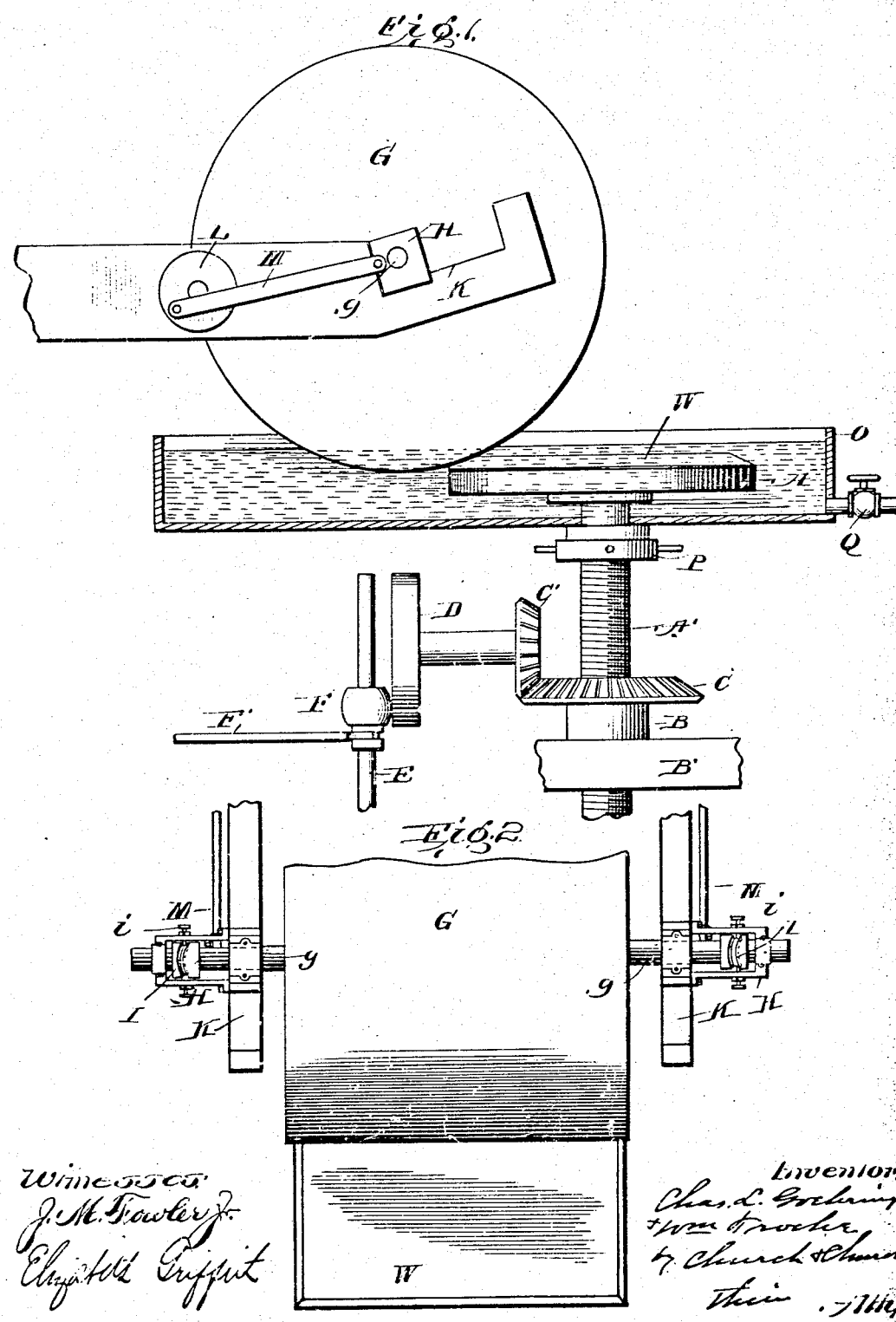

No. 749,551.

Patented January 12, 1904.

UNITED STATES PATENT OFFICE.

CHARLES L. GOEHRING AND WILLIAM TROCHE, OF AKRON, OHIO; SAID TROCHE ASSIGNOR TO SAID GOEHRING.

ART OF BEVELING GLASS OR LIKE SUBSTANCES.

SPECIFICATION forming part of Letters Patent No. 749,551, dated January 12, 1904.

Application filed September 9, 1901. Serial No. 74,751. (No specimens.)

*To all whom it may concern:*

Be it known that we, CHARLES L. GOEHRING and WILLIAM TROCHE, of Akron, in the county of Summit and State of Ohio, have invented certain new and useful Improvements in the Art of Beveling Glass or Like Substances; and we hereby declare the following to be a full, clear, and exact description of the same, reference being had to the accompanying drawings, forming a part of this specification, and to the letters of reference marked thereon.

This invention relates to the art of producing bevels or diagonal planes on the edges of glass plates, disks, or the like, the objects of the invention being to simplify the process whereby the output may be increased, the percentage of breakage reduced, and the skilled labor heretofore found necessary largely dispensed with. In this art as heretofore commonly practiced the plate or article to be beveled, be it either a straight-edge bevel or a curved bevel, has been subjected to a series of independent steps or operations, these steps or operations being commonly designated as the "sand-wheel," the "emery-wheel," the "smooth-stone," and the "white-wheel" processes. The first three steps require the employment of highly-skilled and expensive labor, and in accordance with the present improvements it is designed to dispense with the necessity of performing these three separate steps or operations, and in some instances also the fourth step or operation, and to combine the whole of said operations or to perform all the work usually accomplished thereby at a single operation.

The present improvements are more particularly applicable to the beveling of straight edges, although features of the invention may be applied with advantage to the beveling of curved (round or oval) edges, and hence, save where otherwise indicated, it is not desired to limit the invention specifically to the straight-edge beveling.

In the practical application of the present improvements the bevel is formed by grinding, as by a rotary grinder or stone which is adapted to be brought into contact with that portion of the edge to be removed, the grinder and the work being ground being moved one with respect to the other in the plane of the bevel and in direction transversely of the axis of the grinder or of the length of the bevel being formed, whereby the cut formed by the stone leaves a flat, as contradistinguished from a concave surface. The present method contemplates also a slight movement of the grinder and work with respect to each other in the plane of the bevel and in direction longitudinally of the axis of the grinder or the edge being beveled, whereby the cutting of the grinder is facilitated and a better finish produced. In order to equalize the strains on the edge of the frangible material being operated upon, the said edge is simultaneously acted upon throughout its entire length, for which purpose in the practical working of the machine the grinder or stone must be of a length at least equal to the length of the edge being beveled, and where a longitudinal movement of the grinder and work with respect to each other takes place the grinder must be of a length equal to the length of the work plus the length or extent of such longitudinal movement in order that the entire edge of the work may be simultaneously subjected to the pressure of the grinder and in equal degree throughout the entire grinding operation. To insure still greater uniformity of the grinding action as well as to effectually distribute or dissipate the heat or other forces created at the grinding-point by the action of the abrading-surface of the grinder, the whole edge, and preferably also the entire plate being operated upon, is immersed beneath the surface of a body of water preferably contained in a pan or tank surrounding said plate or the work, together with the lower portion of the stone or grinder. Under such conditions it is found that the speed at which the grinding operation may be carried forward may be greatly increased without injuring the work, and due largely to this fact it has been found that a material saving in time may be effected by forcing the cutting or grinding operation during the initial stages of the work when it is not important to produce a fine finish or surface, and then by reducing the speed of the feeding mechanism, if mechanism be employed, or by reducing the pressure exerted between the grinder and surface being operated upon during the final stages of the grinding operation the desired finish of the surface may be secured. In fact, it is found that almost a perfect surface finish may be secured by a final step, which consists in arresting the movement of the grinder and work in a direction toward each other and allowing the other movements to continue, thereby reducing to a common level all of the minute projections between cuts, such as are caused by the cutting-grains of the grinder. This final step, it is found, is materially promoted by the several movements of the grinder and work transversely with respect to each other inasmuch as no one portion of the grinder comes a second time upon the same identical portion of the surface, and consequently there is no tendency to produce ridges or scratches such as would endanger the final finish of the surface. In some instances where a particularly fine surface is to be produced after the feed or movement of the grinder and work toward each other has been arrested for a given short period, so as to form an exceedingly minute space between the grinder and said surface, the work and grinder may be removed from the water either by elevating the grinder and work or by lowering the level of the water and then feeding in between the grinder and work a fine abrading material, which may be in paste form and daubed on the surface of the grinder. This fine abrading material may be pumice or equivalent, such as is now commonly employed for polishing surfaces of glass. Practice has demonstrated that with the ordinary grinder a high degree of polish may be imparted to the surface of the bevel if care be taken that the whole surface has been previously worked over by the grinder without allowing the grinder and said surface to approach each other beyond a given point at which the feeding motion is arrested.

This invention comprehended by the present application may be carried into practice commercially by apparatus—such, for instance, as set forth in our Patents Nos. 737,387, 737,388, and 737,389, dated August 25, 1903, and the applications for which were pending contemporaneously with this application—or, if desired, by apparatus such as illustrated diagrammatically in the accompanying drawings.

In said drawings, Figure 1 is a diagrammatic view illustrating in side elevation the working parts of an apparatus or mechanism for carrying the present improvements into practice. Fig. 2 is a top plan view of the grinder illustrated in Fig. 1 and showing a plate in position for being beveled.

In said drawings, W is the glass plate or work, and the letter A indicates a work support or table, preferably mounted on the upper end of or supported by a feed-screw A', passing down and coöperating with a nut B, journaled in a fixed bearing B' and adapted to be rotated to raise or lower the screw and work by miter-gears C C'. The gear C' is driven by the friction-disk D, and the disk D derives its motion from a shaft E through the medium of an interposed friction-wheel F. The friction-wheel F while rotating in unison with the shaft E is adapted to be moved longitudinally of said shaft and across the face of the disk by means of a shifter F or other preferred devices, whereby the disk D may be given a differential speed and the work advanced fast or slow, or by moving the friction-wheel to the center of the disk or entirely off of the disk the feed may be arrested.

G indicates the grinder, which is preferably in the form of a cylindrical stone suitably mounted on a shaft $g$, supported in end bearings H, in which said shaft may move both transversely and longitudinally of its axis, whereby the stone may be given both a rotary movement and a movement longitudinally of its axis. For moving the shaft and stone longitudinally the said shaft may be provided with a cam-groove I at each end, and a fixed pin $i$ on the bearing H, coöperating therewith, will give the desired result whenever the stone is rotated. The stone may be rotated by any approved driving mechanism, (not illustrated herein,) and in addition to its rotary and its longitudinal movements the stone is given a bodily movement in the plane of the bevel to be formed, the latter movement being in direction at substantially right angles to its axis of rotation. Various mechanisms may be employed for giving the latter movement as described, for instance, in the before-mentioned patents; but as a simple embodiment there is illustrated herein a pair of guides K, in which the bearings H are mounted, said guides K being set or inclined at the desired angle, and the bearings H are caused to move along said guides or ways K at the same time that the stone is rotated and moved longitudinally of its axis. The bearings H may be moved, if desired, by crank-wheels L, connected with said bearings by connecting-rods M, and it is obvious that by changing the angle of the guides or ways K the stone may be moved to cut bevels of any desired angularity without altering or modifying the remaining mechanism.

From Fig. 2 it will be observed that the stone or grinder is of greater length than the edge of the plate W being operated upon, from which it follows that during the entire grinding operation the whole extent of said edge is under uniform pressure and strain. Thus there is no tendency to crack or injure the plate because of unequal strains or tension due either to the grinding pressure or heat or other force generated at the grinding-point. The difficulties incident to these unequal strains are still further eliminated or overcome, as before stated, by immersing the grinding-point beneath a body of water, for which purpose a pan or tank O is preferably mounted on the screw A and supported by a nut P, whereby when desired said pan may be lowered, so as to permit of subsequent operations while the work and grinder are above the surface of the water; or, on the other hand, said pan may remain in place and the liquid be drawn off through a faucet Q, provided for the purpose.

With such an apparatus the present improvements may be carried out as follows: The plate to be beveled is first placed upon the holder or table and the stone set in operation. After water has been let into the pan or tank to a sufficient depth to immerse the grinding-point the feeding of the work toward the stone is inaugurated by shifting the friction-wheel F from a central position toward the periphery of the disk D. As the disk D begins to rotate, said friction-wheel being near the center will cause said disk to rotate at a relatively high rate of speed. Thus during the initial grinding the work will be fed rapidly toward the grinder or stone; but as said grinding operation progresses the friction-wheel is moved farther toward the periphery of said disk, thereby gradually decreasing the speed of such feed until finally when the desired depth of bevel has been reached the feeding operation may be entirely suspended either by arresting the rotation of the drive-shaft or by moving the friction-wheel beyond the periphery of the disk. By arresting the movement of the disk the feed of the work and stone or grinder toward each other is absolutely stopped, but the transverse movements of the stone continue, thereby dressing off the surface to form a perfect plane, and, in fact, by so arresting the feed it is found that an appreciable space will be formed between the grinder and the surface of the work. The process may be arrested at this point, if so desired, and the work subjected to the usual final finishing steps now commonly used and which do not require highly-skilled labor; or, if so desired, the water may be withdrawn and a fine abrading material fed in between the surface of the grinder or stone and the work, thereby producing a more perfect final finish.

Having thus described our invention, what we claim as new, and desire to secure by Letters Patent, is—

The herein-described improvement in the art of grinding glass plates, which consists in immersing the part of the plate to be ground and grinder at the grinding-point, in a body of liquid and maintaining the same immersed during the grinding operation.

CHARLES L. GOEHRING.
    WILLIAM TROCHE.

Witnesses:
 F. J. STEINERT,
 JACOB STEINERT.